United States Patent [19]

Fleischer

[11] 4,265,481

[45] May 5, 1981

[54] FOLDING BABY CARRIERS

[76] Inventor: Henry Fleischer, 18 Notch Park Rd., Little Falls, N.J. 07424

[21] Appl. No.: 927,107

[22] Filed: Jul. 24, 1978

Related U.S. Application Data

[63] Continuation-in-part of Ser. No. 759,066, Jan. 13, 1977, Pat. No. 4,181,356.

[51] Int. Cl.³ .......................... A47C 4/00; A47C 1/02
[52] U.S. Cl. ........................................ 297/30; 297/75; 297/464
[58] Field of Search ................. 297/256, 255, 250, 42, 297/43, 44, 45, 68, 464, 380, 364, 30, 75, 76; 248/421; 108/113

[56] References Cited

U.S. PATENT DOCUMENTS

| 240,991 | 5/1881 | Fuller . | |
|---|---|---|---|
| 523,903 | 7/1894 | McPhee et al. . | |
| 564,253 | 7/1896 | McCaffrey | 297/377 X |
| 633,012 | 9/1899 | Kidd et al. | 297/390 X |
| 669,334 | 3/1901 | Baldesberger | 297/380 X |
| 679,636 | 7/1901 | Parmelee | 297/42 X |
| 770,852 | 9/1904 | Grover . | |
| 817,816 | 4/1906 | Stevens | 297/68 |
| 1,105,234 | 7/1914 | Andrews | 297/44 |
| 1,414,897 | 5/1922 | Reilly . | |
| 2,493,646 | 1/1950 | Schmidt . | |
| 2,503,942 | 4/1950 | Engelberg et al. | 297/76 X |
| 2,588,574 | 3/1952 | Rizzolo | 297/76 |
| 2,685,325 | 8/1954 | Webster | 297/30 |
| 2,710,645 | 6/1955 | Luckhardt | 297/30 X |
| 2,790,484 | 4/1957 | Pollack | 297/377 X |
| 3,159,114 | 12/1964 | Haunost | 108/113 X |
| 3,239,271 | 3/1966 | Bergerson | 297/377 X |
| 3,345,105 | 10/1967 | Levy et al. | 297/30 |
| 3,463,504 | 8/1969 | Petry et al | 297/377 X |
| 3,784,252 | 1/1974 | Peterson | 297/364 |
| 4,084,849 | 4/1978 | Ishida | 297/377 |

FOREIGN PATENT DOCUMENTS

| 755904 | 4/1967 | Canada | 297/377 |
|---|---|---|---|
| 1948848 | 6/1971 | Fed. Rep. of Germany | 297/464 |
| 1090517 | 11/1967 | United Kingdom | 297/377 |

*Primary Examiner*—James T. McCall

[57] ABSTRACT

Collapsible baby carriers are provided which may be employed by themselves as car beds, car seats, or infant seats or in conjunction with collapsible frames to provide strollers, carriages, high chairs, youth chairs, bathinettes and the like. One embodiment of the collapsible carrier involves three-way carriers which require no locks or fasteners, remain open as long as an infant is positioned therein and when desired, are easily collapsed. The three-way carriers include a head-back rest portion, body or seat portion and leg-foot portion. The positions of the head-back rest portion and the leg-foot portion may be adjusted independently of each other. Alternatively, movement and positioning of one of the head-back rest portion and leg-foot portion may cause corresponding opposite movement and positioning in the other.

40 Claims, 29 Drawing Figures

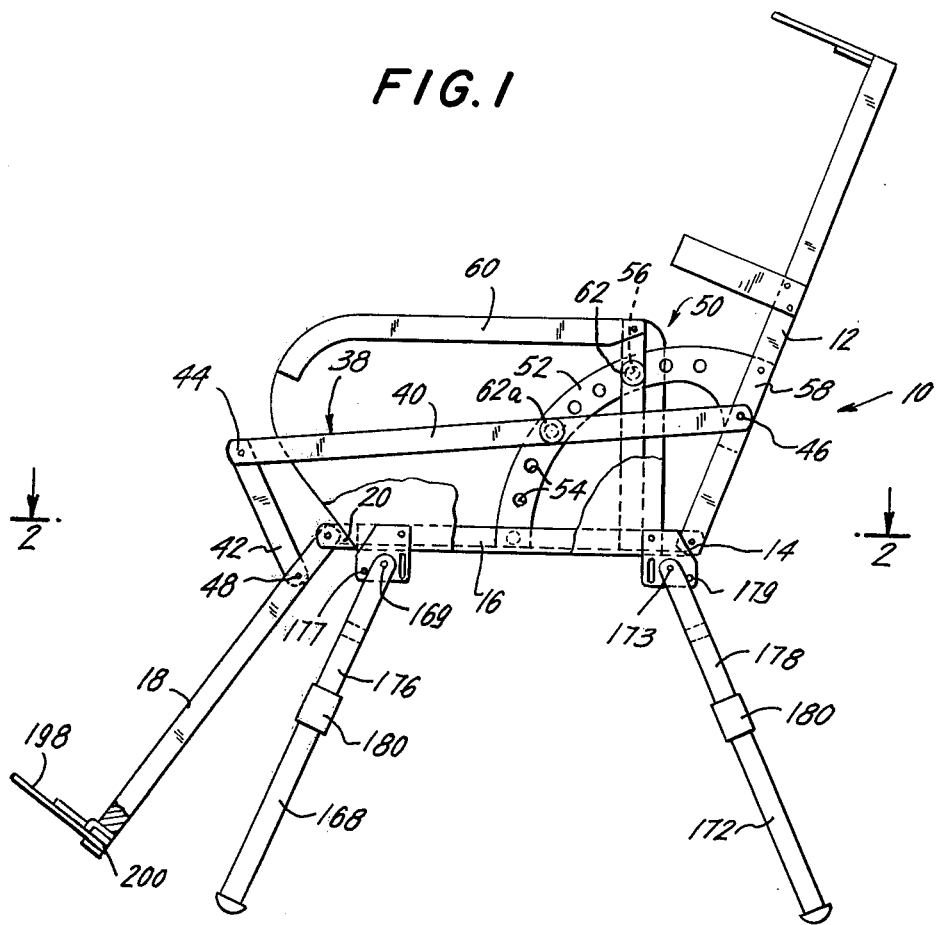

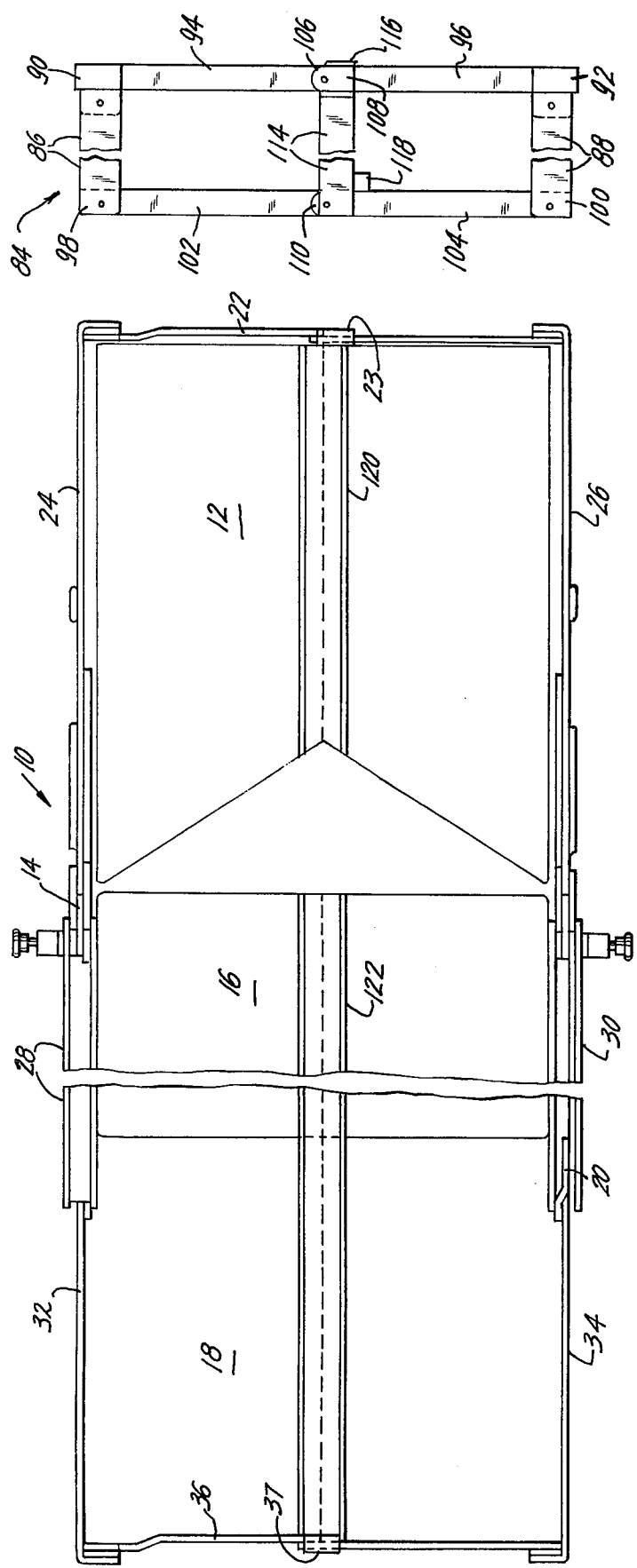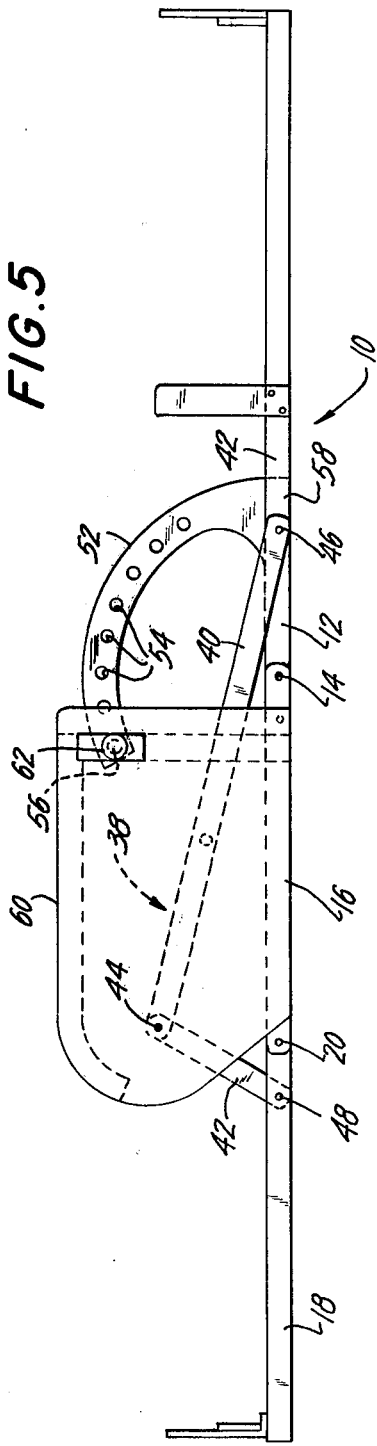

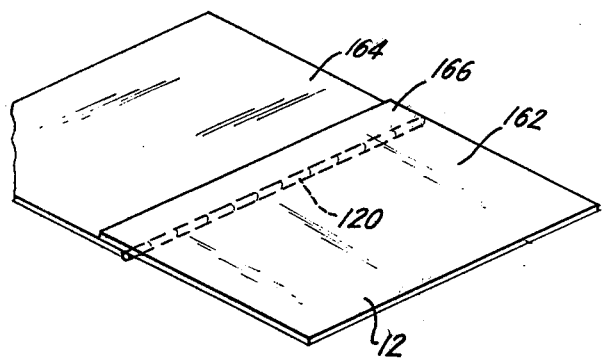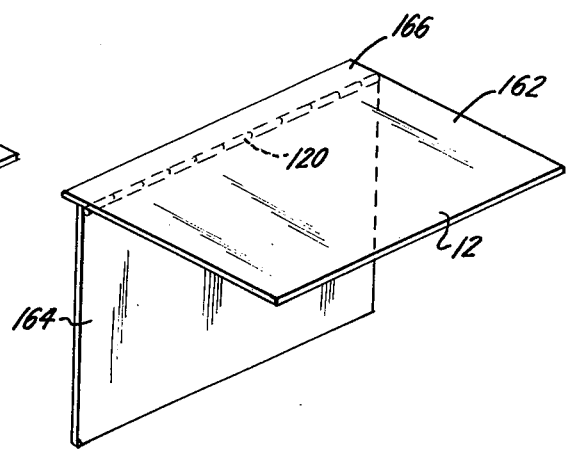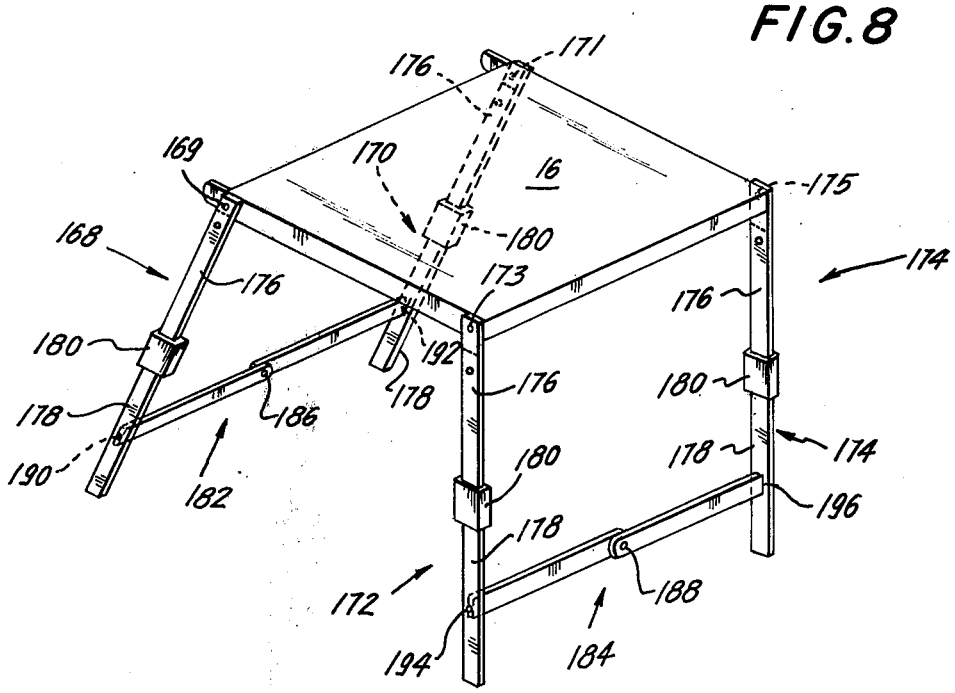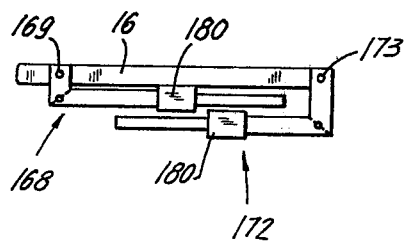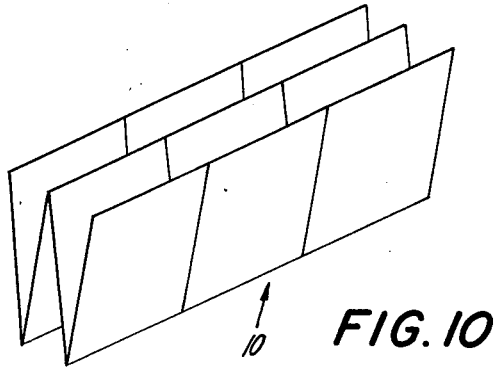

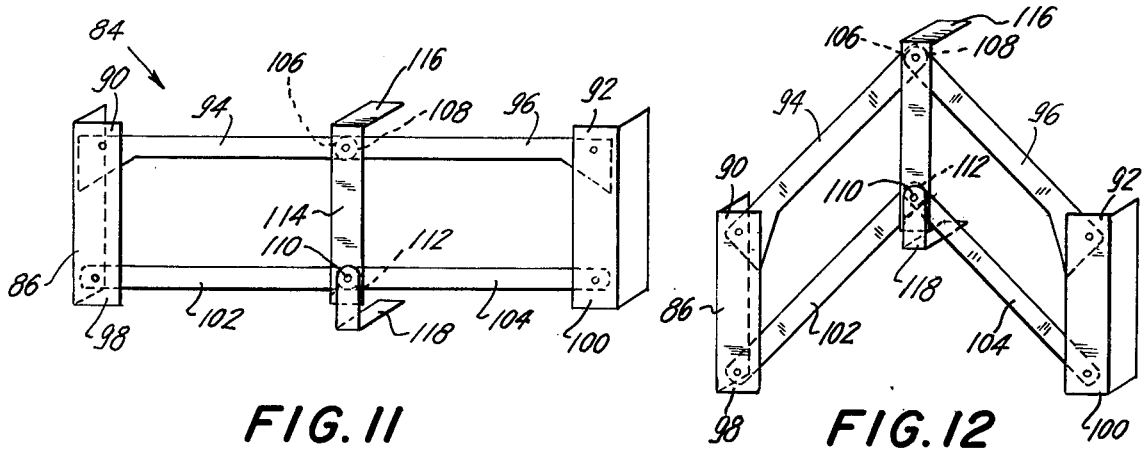
FIG. 11    FIG. 12
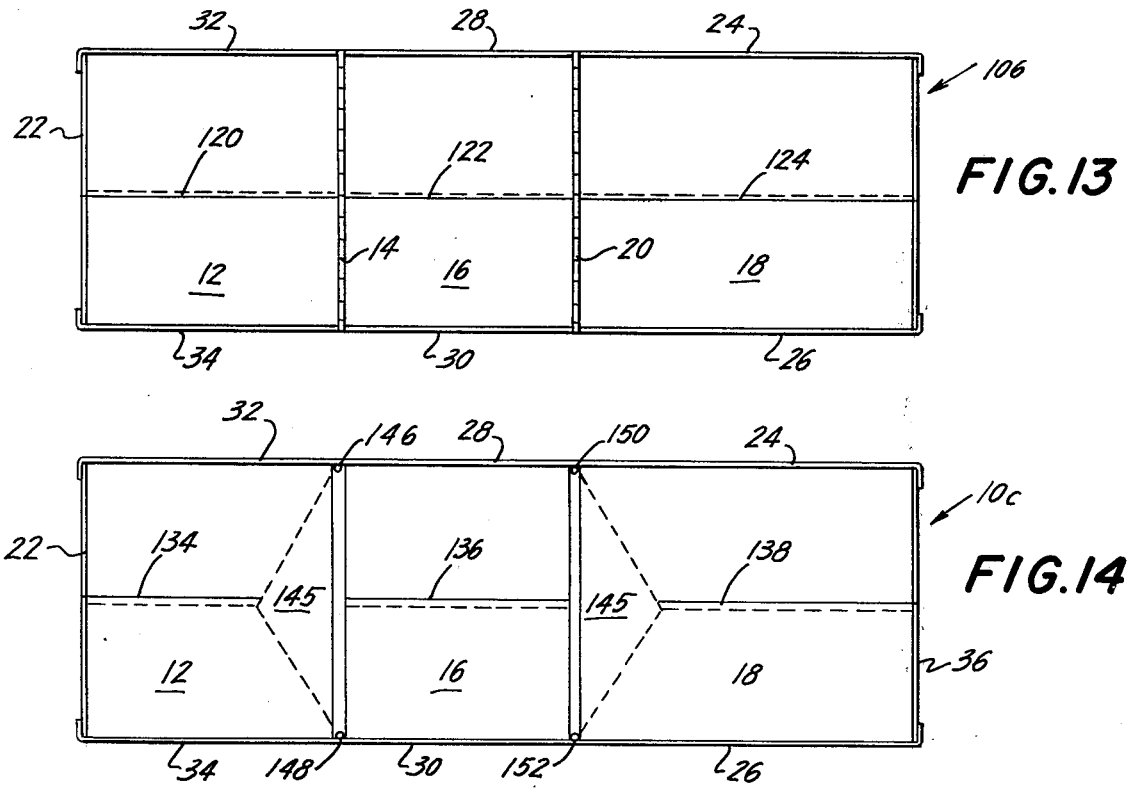
FIG. 13
FIG. 14
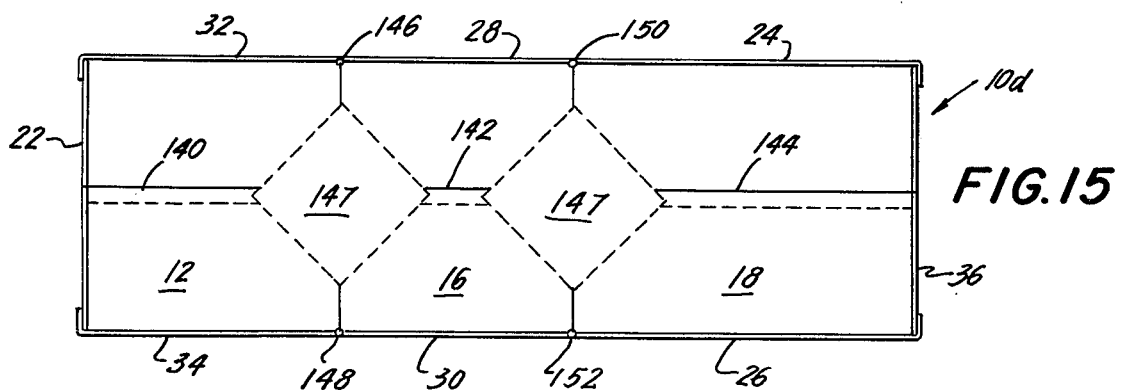
FIG. 15

FIG. 20
FIG. 21A
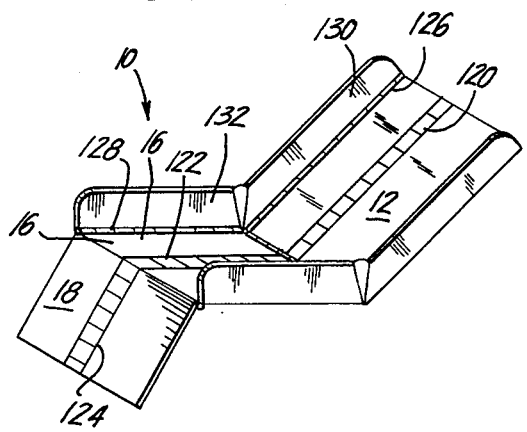
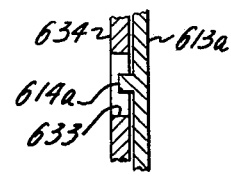
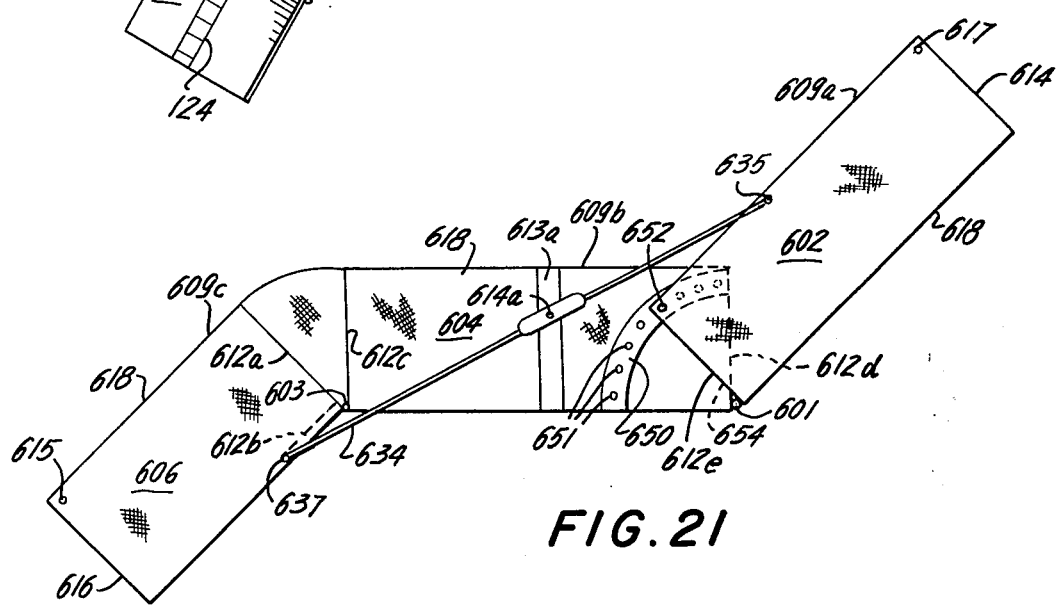
FIG. 21
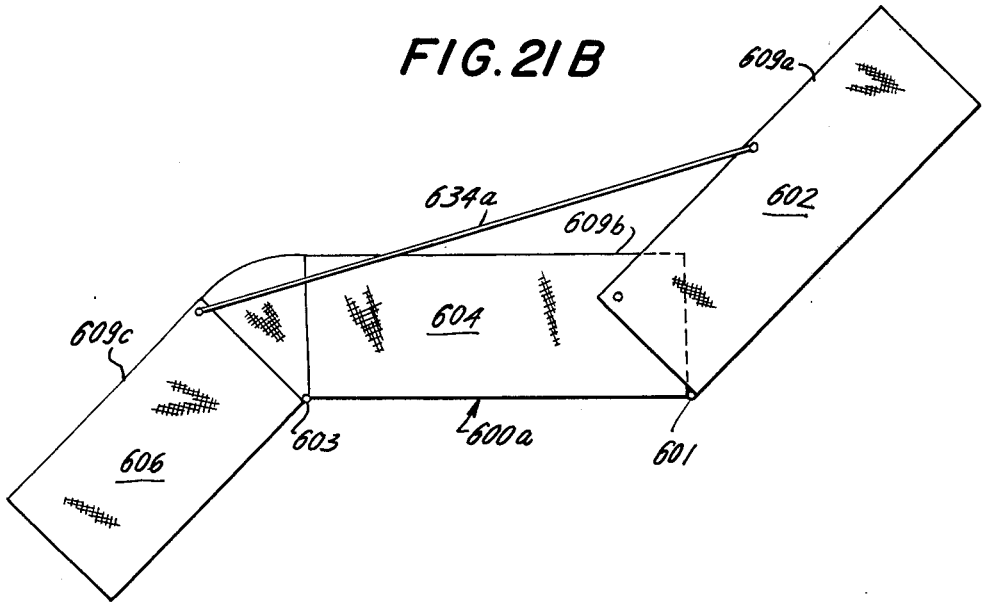
FIG. 21B

FOLDING BABY CARRIERS

REFERENCE TO OTHER APPLICATIONS

This application is a continuation-in-part of application Ser. No. 759,066, filed Jan. 13, 1977 now U.S. Pat. No. 4,181,356.

FIELD OF THE INVENTION

The present invention relates to collapsible carriers for infants and children which are capable of being employed by themselves or in conjunction with collapsible frames to provide a system capable of functioning as a car bed, car seat, infant seat, stroller, carriage, high chair and the like.

BACKGROUND OF THE INVENTION

The choice in child carrying and securing devices existing in the marketplace today is endless. There are many different types of devices serving the same or different functions. Thus, the prospective buyer asks not only what brand of device to buy but whether car beds, car seats, infant seats, youth seats, high chairs, bathinettes, carriages, strollers, walkers, etc. are all actually necessary. Of course, each of these devices plays an important function at one time or another. But where are all these devices to be stored? How is one able to pay for all of them? Unfortunately, until now, the new parent had no real answers to these questions. These items are necessities so that the parent was required to purchase each device and somehow make the necessary storage room therefor.

The present invention provides a real solution to the problem of providing each of the child holding, carrying and supporting functions discussed above in a manner so as to require a minimum of expense and storage capacity.

BRIEF DESCRIPTION OF INVENTION

In accordance with the present invention, there is provided a collapsible carrier for infants which includes a body or seat portion, a head-back rest portion, and leg-foot portion, transversely disposed hinges for hingedly connecting the seat portion and back rest portion to each other and for hingedly connecting the seat portion to the leg-foot portion, and optionally at least one longitudinally disposed hinge disposed intermediate sides of and which may run the length of the leg-foot portion, the body or seat portion, and/or the head-back rest portion, and when present dividing the leg-foot portion, the seat portion and/or back rest portion each into two longitudinal sections. The carrier may be collapsed by moving the head-back rest portion and leg-foot portion about the transversely disposed hinges into alignment with the seat portion to fold the carrier flat. Preferably one of the longitudinal sections is moved about the longitudinally disposed hinge into close proximity to the other of said longitudinal sections to form a stick configuration having an inverted-V cross-sectional configuration.

The carrier may be formed of a rigid material such as hard plastic, metal, wood, or laminate, so that it is capable of supporting its own weight.

Alternatively, the carrier may be formed of a flexible material such as canvas, fabric or soft plastic and, in such case, may further include a carrier support frame disposed about and removably connected to the sides and ends of the leg-foot portion, seat portion and the head-back rest portion.

The carrier as described above may be attached to a frame, such as a stroller, carriage and/or high chair frame. In such case, the carrier will include frame attaching means comprising grooves, rods or rails adapted to engage corresponding members of a frame.

In another embodiment of the present invention, the back rest portion and leg-foot portion of the carrier will further include side and end bar supports disposed about the sides and ends of the back rest portion and leg-foot portion, the side and end bar supports being pivotally connected to each other, and the seat portion will include seat side and end bar supports disposed about the sides and ends of the seat portion, the seat side and end bar supports being pivotally connected to each other. In such case, the back rest portion, leg-foot portion, and seat portion may be formed of flexible material, the flexible material of the head-back rest portion, seat portion, and leg-foot portion being suspended from their respective bar supports.

The leg-foot rest portion may be removably connected to the seat portion.

In one of the preferred embodiments of the invention, control bar means are connected to the head-back rest portion and the leg-foot portion whereby when the head-back rest portion is pivoted about the transverse hinge connecting the head-back rest portion and the seat portion, corresponding opposite movement will be imparted to the leg-foot portion. In addition, strut means may be employed to pivotally connect the control bar means to a seat side bar support, for supporting and providing a pivot point for the control bar means.

Still another collapsible baby carrier, in accordance with the present invention, is provided which includes a bottom wall, a centrally disposed longitudinal hinge running the length of the bottom wall, a pair of spaced apart side walls, each hingedly connected to the bottom wall via longitudinally disposed hinges, and at least one end wall hingedly connected to the bottom wall via a transversely disposed hinge and connected to the side walls, the end wall including a vertically disposed hinge spaced by the ends thereof. The carrier may be collapsed by collapsing the centrally disposed hinge inwardly or outwardly and collapsing the vertical hinge in the end wall inwardly or outwardly, thereby causing the bottom wall to fold inwardly or outwardly, the end wall to fold inwardly or outwardly and the side walls to move inwardly toward each other so that the collapsed carrier may take on a W-shaped cross sectional configuration. If desired, the above-described carriers may include the side and end walls and hinge arrangement here described.

The above-described carriers may include a hinge flap or overhanging lip formed as an extension of one of the two longitudinal sections formed by the longitudinal hinge disposed in the head-back portion, seat portion and/or leg-foot portion. The hinge flap or overhanging (longitudinal) lip overlaps or covers the longitudinal hinge and prevents the head-back portion, seat portion and/or leg-foot portion from buckling or bowing downwardly and serves as a protective cover over the longitudinal hinge. Where possible, a similar hinge flap or overhanging lip may be employed in conjunction with other hinges to prevent undesired buckling thereof.

BRIEF DESCRIPTION OF THE ACCOMPANYING FIGURES AND PREFERRED EMBODIMENTS OF THE INVENTION

FIG. 1 is a side schematic view of a preferred three-way carrier in accordance with the present invention including unique control bar means operatively connecting a head-back rest portion to a leg-foot rest portion;

FIG. 2 is a plan sectional view of the carrier of FIG. 1 taken along lines 2—2 thereof;

FIG. 3 is a plan view of the carrier shown in FIG. 1;

FIG. 4 is an end isometric view of a portion of the carrier shown in FIG. 3;

FIG. 5 is a side view of the carrier shown in FIG. 1 in a mode for use as an infant bed;

FIGS. 6 and 7 are perspective views of a portion of the carrier of FIG. 1 in a partially collapsed state;

FIG. 8 is a schematic perspective view of the seat portion of the three-way carrier of FIG. 1 showing an interlocking leg structure;

FIG. 9 is a side view of the seat portion shown in FIG. 8 with the legs in folded condition;

FIG. 10 is a schematic perspective view of the carrier of FIG. 1 in a partially collapsed state;

FIGS. 11 and 12 are end views of the carrier as shown in FIG. 3 in various stages of folding;

FIGS. 13 to 16 are plan views of alternative embodiments of carriers in accordance with the present invention;

FIG. 20 is a perspective view of carriers of FIGS. 1, 13 to 16 including side protective panels;

FIG. 21 is a schematic side view of another embodiment of a three-way carrier in accordance with the present invention in a working position as an infant seat for the home or car;

FIG. 21A is a fragmentary end view of a portion of the carrier shown in FIG. 21;

FIG. 21B is a schematic side view of another embodiment of a three-way carrier in accordance with the present invention;

DETAILED DESCRIPTION OF THE FIGURES

Figure 16:
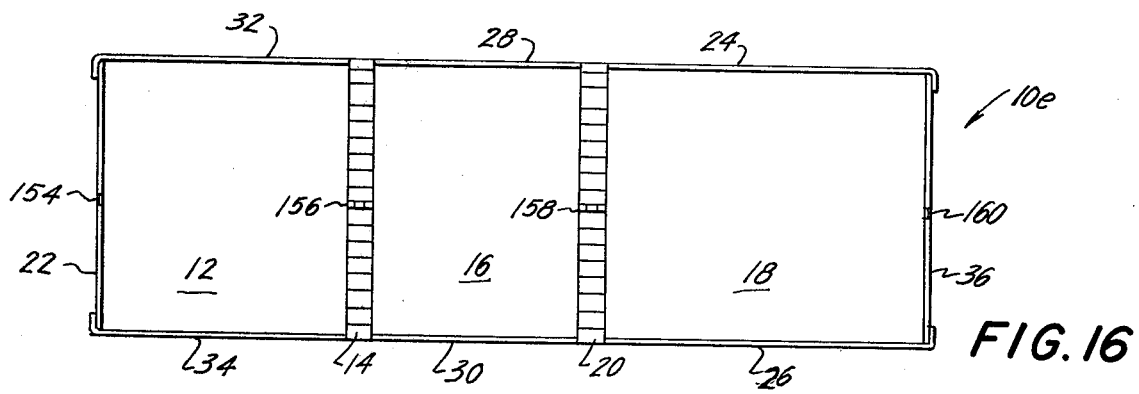

Referring now to FIGS. 1 to 5, there is shown a preferred three-way carrier in accordance with the present invention identified generally by the numeral 10.

The carrier 10 is referred to as a three-way carrier because it includes three sections which may be easily manipulated to achieve various operating positions through the use of unique control bar means. The carrier 10 may be employed by itself as a car seat which may be converted into a car bed, a high chair, a youth chair, an infant seat and the like and when used with an appropriate frame may be part of a stroller combination, carriage combination, baby walker, and the like. Furthermore, the carrier 10 is easily collapsed into a "stick" configuration or flat configuration (where the three sections are folded flat against each other) to take up a minimum of space during storage. Thus, the carrier 10 of the invention is designed for versatility. In order to achieve the desired versatility, the carrier 10 will preferably have the following structure.

The carrier 10 includes head-back portion 12 hingedly connected via hinge 14 to seat portion 16, and leg-foot portion 18 hingedly connected via hinge 20 to seat portion 16, as shown.

In the embodiment as shown in FIGS. 1 to 5, as best seen in FIG. 3, the carrier 10 includes peripheral support structure in the form of head-back portion end bracing 22 and side bracing 24 and 26; the seat portion includes side bracing 28 and 30, pivotally connected to the head-back portion side bracing 24 and 26, respectively; and the leg portion includes side bracing 32 and 34 pivotally connected to respective side bracings 28 and 30 of the seat portion, and leg portion end bracing 36 pivotally connected to the leg portion side bracing 32 and 34 as shown.

It will be appreciated that the above-described support braces may not be entirely necessary where the head-back portion, seat portion, and/or leg portion of the carrier are made of rigid self-supporting materials, such as metal, wood, hard plastic, laminates, and the like.

As will be seen hereinafter, the carrier 10 may include various types of hinging mechanisms hingedly connecting the three sections to each other to effect the positioning of the three sections with respect to one another as well as to facilitate folding or collapsing of the carrier to a flat disposition or stick form for storage purposes.

In a preferred embodiment of the invention, the carrier 10 may include a control bar mechanism generally indicated by the numeral 38 whereby movement of the head-back portion 12 or leg portion 18 toward or away from the seat portion 16 will effect corresponding but opposite movement in the leg portion 18 or head-back portion 12. Any of the control bar mechanisms described hereinafter may be employed herein. In a preferred embodiment of the invention, the control bar mechanism 38 as shown in FIGS. 1 to 5 includes a pair of control bars 40 and 42 pivotally connected to each other via pivot means 44 and with control bar 40 connected (preferably pivotally connected) to a side portion 26 of the head-back portion 12 via connecting means 46, and control bar 42 connected to a side portion 34 of leg portion 18 via fixed connecting means 48 as shown. A similar pair of control bars 40 and 42 may be pivotally connected to each other and pivotally connected to the opposite sides 24 and 32 of the head-back portion 12 and connected to leg portion 18, respectively.

The control mechanism 38 so-described functions as follows. Where it is desired to collapse the carrier 10 from the position shown in FIG. 1 to the horizontal flat position shown in FIG. 5 one need simply move the head-back portion 12 downwardly so that the upper part of the head-back portion moves away from the seat portion 16 to a horizontal position. With such movement, the control bar 40 automatically moves to the rear pivoting about control bar 42 while causing control bar 42 to lift the leg portion 18 to the horizontal position.

Where it is desired to reposition the carrier from the position shown in FIG. 5 to that shown in FIG. 1 or other non-horizontal position, the leg portion 18 is simply lowered (or head-back portion 12 is simply raised) thereby causing the control bars 42 and 40 to raise the head-back portion 12 (or lower the leg portion 18) a corresponding distance.

The control mechanism may include lock means such as a pin-opening arrangement, plunger mechanism or other conventional locking means to fix the position of control bars 40 and 42 with respect to each other, thereby temporarily locking the head-back portion 12 and leg portion 18 at desired angles to the seat portion, including in the horizontal position shown in FIG. 5.

As seen in FIGS. 1, 5 and 17 to 19, the carrier 10 may include a head-back portion-tilt mechanism 50 whereby the head-back portion 12 may be adjusted at a desired angle to the seat portion 16. The tilt mechanism 50 includes hinge means 14 disposed between the seat portion 16 and head-back portion 12, and an adjustable positioning means or semi-circular member 52, including a plurality of openings 54 placed around the semi-circular member, each opening adapted to receive a knub, pin or plunger 56 as will be described hereinafter.

An upper end portion of the semi-circular member 58 is connected to the head-back portion 12 as shown or if desired to the seat portion 16. An arm rest member or other similar member 60 is connected to the seat portion 16 and includes at least one opening 62 which is adapted to be aligned with one of the openings 54 of the semi-circular member 52.

Figure 17:
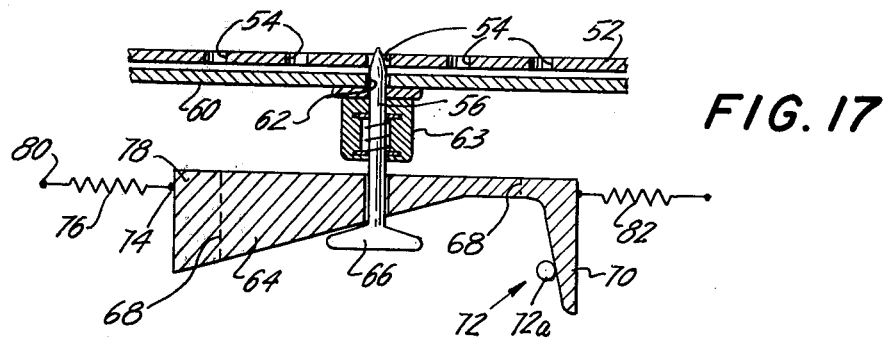
FIG. 17 is a schematic fragmentary plan view of a plunger arrangement employed in positioning or tilting the back rest portion of the carrier of FIG. 1 at a desired angle.

The plunger or similar spring-loaded pin member 56 best shown in FIG. 17 includes casing 63 which is held in place or connected to the arm rest member 60 by screws, welds, rivets, etc., so that spring-loaded plunger or pin 56 may be in alignment with and protrude through opening 62 of the arm rest member 60 and one of the openings 54 of the semi-circular member 52. Thus, it is seen that by simply withdrawing plunger or pin 56 from the opening 54 of the semi-circular member 52, the head-back portion 12 is free to move toward or away from the seat portion 16. The position of the head-back portion 12 may be fixed at a desired tilt or angle to the seat portion 16 by simply releasing the plunger 56 so that it extends through the opening 62 of the arm rest member 60 and one of the openings 54 of the semi-circular member 52.

Where the above-described tilt mechanism 50 is employed in conjunction with a control mechanism 38 as described above, if desired the control bars 40 and 42 may be used in place of the arm rest on member 60. In such case, the control bar 40 may include an opening 62a and the plunger mechanism 56 may be attached to the control bar 40 in a manner such that the plunger 56 extends through one of the openings 54 of the semi-circular member 52 (depending upon the desired angle of the head-back portion to the seat portion) and the opening 62a of the control bar 40. Such a tilt mechanism and plunger mechanism will function as described above.

Furthermore, in each of the embodiments of the tilt mechanism described herein, the semi-circular member or arc member 52 may be replaced by a series of openings located in side panels or supports for a seat disposed on the seat portion 16 as will be apparent to those skilled in the art.

If desired both the control bars 40 and 42 as well as arm rest member 60 may be included in carrier 10. In such case, either may be employed in conjunction with the plunger mechanism 56 and tilt mechanism 50.

Figure 18:
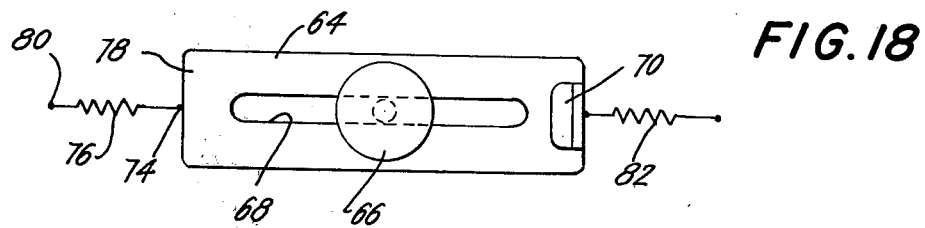
FIG. 18 is a side view of the plunger arrangement shown in FIG. 17.

The tilt mechanism of the carrier 10 of the invention may also be designed so that it may be released with one motion using one hand. This may be accomplished, as shown in FIGS. 17 and 18 by inserting an inclined member 64 between the head 66 of plunger 56 and the casing 63 of the plunger. The inclined member 64 includes a horizontal slot 68 running therethrough as best shown in FIG. 18 through which the plunger pin 56 extends, while the head 66 of the plunger being larger than the slot 68 functions as a stop to prevent the plunger from completely passing through slot 68. The inclined member 64 also includes gripping or handle means 70 to facilitate movement of said inclined member 64 with respect to the plunger 56.

It will now be apparent that when it is desired to remove or withdraw the plunger pin 56 from the opening 54 of the semi-circular member 52, one need only grip the handle 70 of the inclined member 64 and pull the inclined member 64 which in turn causes the plunger head 66 to move away from the semi-circular member 52, thereby removing or withdrawing plunger pin 56 from the semi-circular member 52 freeing the head-back portion 12 to move. Pushing the handle means 70 and inclined member 64 in the opposite direction will allow the plunger pin 56 to penetrate the opening 54 of semi-circular member 52 thereby fixing the position and angle of the head-back portion 12 with respect to the seat portion 16.

The carrier 10 of the invention including the tilt mechanism 50 described above may be connected to an appropriate frame (a portion of which is shown in FIG. 17 and identified as 72) such as a stroller frame in such manner that the carrier 10 may interact with the frame 72 so that folding of the frame 72 will also cause the carrier 10 to fold or collapse to the closed storage position. Thus, as seen in FIG. 17, the carrier 10 is disposed in frame 72 in a manner such that the handle member 70 of the tilt mechanism 50 hooks about the frame member 72a of the frame 72. Thus, when the frame is to be collapsed, the member 72a of the frame may be pivoted away from plunger 56 thereby forcing handle member 70 and thus inclined member 64 to the rear, forcing the plunger member 56 to retract from the opening 54 of the semi-circular member 52 thereby allowing the head-back portion 12 to be lowered flat to a horizontal position in line with the seat portion 16 as shown in FIG. 5.

Figure 19:
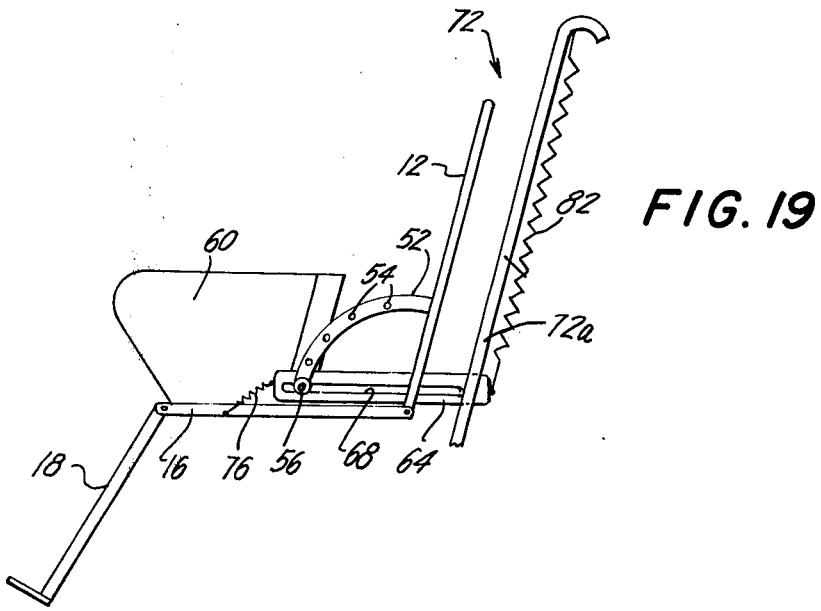
FIG. 19 is a side schematic view of the plunger arrangement of FIGS. 17 and 18 operatively disposed on a carrier as shown in FIG. 1.

If desired, the tilt mechanism 50 described above may include a return spring arrangement in lieu of or together with the handle means 70 described above to allow release or retraction of the plunger mechanism. Thus, one portion 74 of a resilient member such as spring 76 is connected to an end portion 78 of the inclined member 64 as shown in FIGS. 17 and 18 while another portion 80 of the spring 76 is connected to the carrier itself (as shown in FIG. 19). A control cable 82, which may be a spring or cable, is connected to another end 84 of the inclined member 64, for example, in close proximity to said handle means 70. The other end of control cable 82 may be connected to an upper portion of the frame 72 (as shown in FIG. 19) in which the carrier 10 is disposed. Thus, where it is desired to retract the plunger 56 to fold the carrier 10 flat into a horizontal attitude, the control cable 82 may simply be pulled to the rear thereby forcing the inclined member 64 to the rear thereby retracting the plunger pin 56 from the semi-circular member 52. When the control cable 82 is released, the return spring 76 will pull the inclined member 64 in a forward direction thereby causing the plunger 56 to spring inwardly into engagement with an opening 54 in the semi-circular member 52.

It will be appreciated that the tilt mechanism 50 including the afore-described plunger-inclined plane arrangement may be employed on both the right and left side of the carrier of the invention. In such case, the control cable 82 may be interconnected with both the left and right plunger arrangements so that the cable 82 may be controlled with one hand and may release both plungers.

It is important that when the carrier 10 is disposed in a frame 72 such as a stroller frame or when the carrier 10 is used independently of a frame, that in collapsing the carrier 10 the head-back portion 12 be in a horizontal position in line with the seat portion 16 and leg portion 18. The tilt mechanism 50 including the plunger arrangement 56 and the inclined plane 64 and handle member 70 and/or return spring 76 facilitates collapsing of the head-back portion 12 to the horizontal position and subsequent collapsing or folding of the carrier 10 into a stick configuration as shown in FIG. 10.

The end support-brace arrangement referred to generally by the number 84 shown in FIGS. 4, 11, and 12 is of unique design in that it permits the carrier 10 to be folded into a closed position from the action of an outside source such as a stroller frame and the like. The end support-brace arrangement 84 may be connected to the end of the leg portion 18 and/or head-back portion 12 and includes a pair of normally vertically disposed members 86 and 88, the upper ends 90, 92 of each being pivotally connected to upper horizontal members 94 and 96, respectively, and the lower ends 98, 100 of each being pivotally connected to the support bracing of the head-back portion 12 and/or leg portion 18 or connected directly but pivotally to 12 and/or 18 without bracing. Alternatively, the lower ends 98, 100 of the vertical members 86, 88 may be pivotally connected to optional lower horizontal members 102 and 104, as shown. The ends 106, 108 of the upper horizontal members 94, 96 and the ends 110, 112 of the lower horizontal members 102 and 104 (where present) are pivotally connected to intermediate vertical member 114 as shown. The intermediate vertical member 114 includes an overhang or upper lip 116 and an overhang or extending lower lip 118. The lower lip 118 overlaps (and may be connected to) a longitudinal hinge 120 disposed in conjunction with the head-back portion 12 and/or leg portion 18 depending upon where the end structure is situated and prevents the appropriate portion from accidentally closing. Thus, the slightest weight upon the carrier head-back portion 12 or leg portion 18 will prevent such portion from closing.

The upper lip 116 extends over the upper horizontal member 96 and prevents member 96 from moving downwardly and accidentally collapsing the carrier.

The carrier 10 including the end support-brace structure 84 may be collapsed or folded by simply pulling upwardly on the upper lip 116 thereby causing the carrier 10 and end support-brace structure 84 to pivot upwardly at its center raising the intermediate vertical member 114 as shown in FIGS. 11 and 12. This causes the lower lip 118 to pull upwardly on the longitudinal hinge attached thereto to collapse the carrier.

Referring now to FIGS. 9 and 13 to 16. The carrier 10 may include any of a number of hinge arrangements in addition to those discussed above to facilitate folding and opening of same. Thus, for example, in FIG. 13, the carrier 10a includes head-back portion 12 which is hingedly connected to the seat portion 16 by means of transverse hinge 14, while the leg portion 18 is hingedly connected to the seat portion 16 by means of transverse hinge 20. Carrier 10a further includes central longitudinal hinges 120, 122 and 124 running the length of the head, seat, and leg portions. As shown in FIG. 20, carrier 10a may include side longitudinal hinges 126, 128 connected to side panels 130, 132. Upon collapsing of the carrier 10a, the central longitudinal hinges 120, 122, and 124 move upwardly as shown in FIG. 10. The side panels 130, 132 also pivot so that the carrier may be folded into a stick-like configuration having a W-shaped cross section as shown in FIG. 10.

As seen in FIGS. 14 and 15, the carriers 10b, 10c and 10d there shown may include three separate centrally disposed longitudinal hinges which are disjointed and not contiguous with one another. In FIG. 14, the longitudinal hinges 134, 136, and 138 are employed, whereas in FIG. 15, the longitudinal hinges 140, 142 and 144 are employed. In these embodiments, the seat portion 16 may be spaced from the head portion 12 and leg portion 18 as shown or may be connected therewith by means of flexible and/or soft material 145, 147 which itself may bend and function as a hinge to facilitate collapsing and to prevent binding of the carrier when the carrier is attached to and collapsed within a frame. In fact, the carrier 10c and 10d embodiments of FIGS. 14 and 15 may not require transverse hinges at all for folding. Alternatively, the seat portion may be pivotally connected to the head portion and leg portion by means of conventional pivot or hinge means 146, 148, 150, 152 connected between and near the side edges of the various portions as shown in FIGS. 14 and 15.

FIG. 16 illustrates another carrier 10e in accordance with the present invention fashioned in a cloth or other soft flexible material supported by side braces 24, 26, 28, 30, 32, 34 and end braces 22 and 36. The seat portion 16 is pivotally or hingedly connected to each of the head-back portion 12 by means of pivot 14, and the leg portion 18 by means of pivot 20. Hinges 154, 156, 158, and 160 which function as do the longitudinal hinges of FIGS. 13 to 15 are disposed between the seat portion 16 and the head-back portion 12 and the leg portion 18 as well as at the ends of the head-back portion and leg portion as shown.

Each of the carrier embodiments of FIGS. 13 to 16 may be folded in inverted V-fashion as shown in FIG. 10 and may include control bar means 38 connected to the head-back portion 12 and leg portion 18 to facilitate interacting of these portions of the carrier as described with respect to FIGS. 1 to 5. Alternatively, the ends 22, 36 of the various carriers 10–10e may pivot inwardly or outwardly forming a V-configuration when observing same from a plan view. In addition, the end members 22, 36 may be of telescoping construction so that each end is formed of a pair of struts or a tubular member and outer sleeve (and associated lock means) 23, 37 which may be made to overlay (inwardly telescoping) each other when in folded condition or be extended (outwardly telescoping) when in working disposition.

As seen in FIGS. 6 and 7, the head-back portion 12, the seat portion 16, and/or the leg portion 18 may include overlapping longitudinal hinges 120, 122, 124 (only one of which is shown for drawing clarity). In such overlapping hinge, the carrier portion including such hinges will include a first section 162 hingedly connected via hinge 120 to a second section 164. As seen in FIG. 7, the hinge 120 is disposed so that upon collapsing, the hinge moves upwardly and forms an inverted V-shaped portion with the first and second sections 162 and 164. One of the sections (162) overlaps the other 164 along the hinge 120; in the embodiment shown in FIG. 7, the side edge or lip 166 overlaps the hinge 120 and section 164 in order to prevent any discomfort that may be caused by the hinge 120. Furthermore, the overlap 166 prevents downward movement of the sections 162 and 164 beyond a desired point. In this manner, the carrier portion including such overlap or lip 166 is self-supporting and will not buckle or bow outwardly.

In one of the preferred carriers of the invention, the overlapping lip 166 hinge arrangement will be present in at least the head-back portion 12 and seat portion 16 and, if desired, the leg portion 18 of the carrier.

As seen in FIGS. 1 and 8, the carrier 10 of the invention may include a plurality of legs so that when such legs are in their extended working position the carrier may be employed as a car seat, car bed, youth chair, high chair, booster seat and the like.

The legs may comprise four separate legs 168, 170, 172 and 174, each pivotally connected to a portion of the seat portion 16 of the carrier 10 via pivots 169, 171, 173 and 175. The carrier may also include front leg stop members 177 and back leg stop member 179 which prevent the front and back legs from moving past a desired point. The legs 168, 170, 172 and 174 may be extendable or telescoping employing conventional structure to effect same as shown. In the latter case, where the legs are telescoping, each leg will include an upper portion 176 and a lower portion 178 which is smaller in diameter than the upper portion 176 and thus will slidably fit within the upper portion as shown. The upper and lower portion 176 and 178 may include interior threads and exterior threads, respectively, so that the length of the legs may be easily adjusted. Alternatively, a locking nut 180 may be employed to allow or prevent adjustment of the length of the legs. Other conventional extendable means may be employed, including a simple pin-opening arrangement, as will be apparent to those skilled in the art.

In FIGS. 2 and 8 it is seen that the front legs 168 and 170 may be connected to each other via support brace 182 and the back legs 172 and 174 may be connected to each other by means of support brace 184. By means of the above structure, the front legs 168, 170 may be folded as a unit and the back legs 172, 174 may be folded as a unit to the folded position shown in FIG. 9.

The front and back support braces 182 and 184 which support the legs may include central-pivot means 186 and 188, respectively, and may be pivotally connected via pivots 190 and 192 to the front legs and via pivots 194 and 196 to the back legs as shown in FIGS. 2 and 8. Thus, when it is desired to collapse the legs, the central pivots 186 and 188 may be moved up or down, or in or out, as the design of the carrier may dictate.

If desired, the leg-foot portion 18 of carrier 10 may include a foot rest 198 which may be fixed or pivotally attached via pivot 200 to the lower portion of the leg portion 18 as shown best in FIG. 1. The foot rest 198 will normally extend the width of the leg portion.

In addition, the carrier 10 may include various side supports or barriers which may be fixed or pivotally attached to either side of the head rest portion. The carrier 10 may also include side support panels 130 and 132 pivotally connected to either side of the head-back portion 12, seat portion 16 and/or even the leg-foot portion 18 as shown in FIG. 20. Each of the side support members may be pivoted or folded into storage or non-use position.

The carriers 10-10e of the invention may also include a universal base or conventional seat mounting which may permit the carrier to be mounted on a stroller frame, carriage frame as well as on bases or legs so that it may be used as a high chair, car seat and the like.

Figure 22:
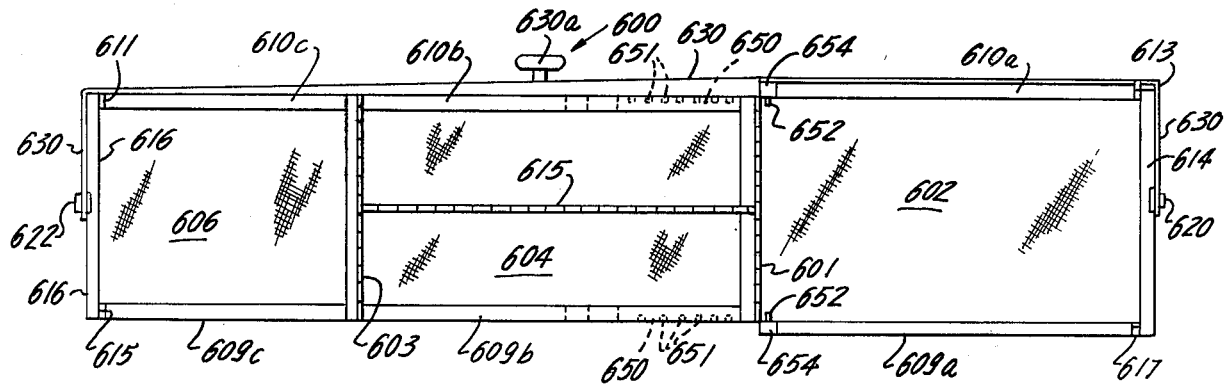
FIG. 22 is a plan view of the three-way carrier shown in FIG. 21.
Figure 23:
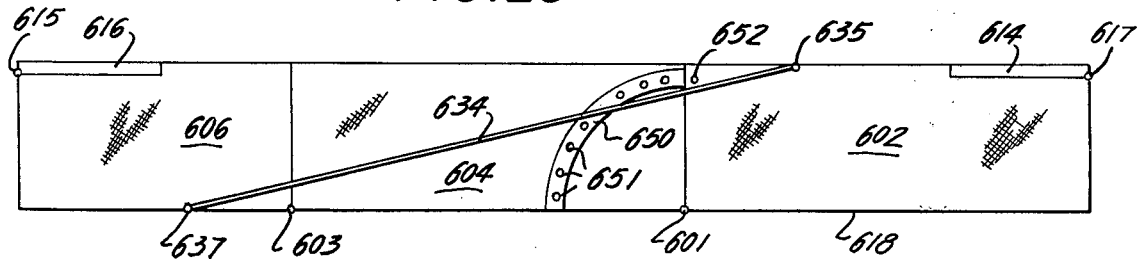
FIG. 23 is a side view of the three-way carrier of FIG. 21 in a collapsed state.
Figure 24:
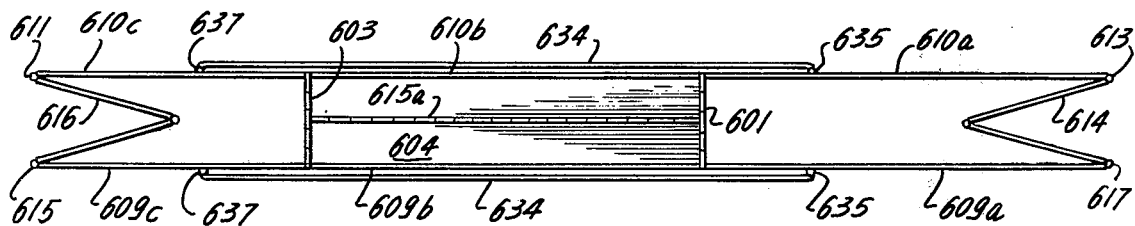
FIG. 24 is a plan view of the three-way carrier of FIG. 21 in a collapsed state.
Figure 24A:
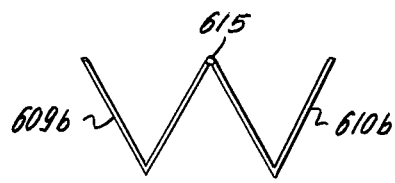
FIG. 24a is a partial view of the bar support frame of FIG. 24 in the collapsed state.

Turning now to FIGS. 21 to 24 there is shown a three-way carrier 600 which includes a head-back portion 602, body or seat portion 604 and leg-foot portion 606, the head-back portion 602 being hingedly connected to body or seat portion 604 via pivot 601 and body portion 604 is hingedly connected to foot portion 606 via pivot 603. The carrier 600 includes bar supports 609a, 609b, 610a, 610b, 610c, 614 and 616 pivotally connected to each other via pivots 611, 613, 615 and 617 and disposed about the four sides thereof as well as bar supports 612a, 612b on foot portion 606, bar supports 612c and 612d on body portion 604, and bar support 612e and head portion 602 (as best seen in the top view of FIG. 22). A soft carrier portion 618 is suspended from and hangs between the bar supports 609a, 609b, 609c, 610a, 610b, 610c, 614 and 616. Bars 614 and 616 include locks or pivots 620, 622 respectively, as shown in FIG. 22, which locks or pivots may be connected to cable 630 controlled by handle 630a; the cable 630 may be used to pull the locks 620, 622 open and cause bars 614 and 616 to pivot inwardly as shown in FIGS. 24, 24A to collapse the bar support frame of the carrier. At the same time the center hinge 615a of body part 604 may be collapsed upwards or downwards as described hereinbefore so that the body part 604 will be collapsed from that shown in FIG. 22 to that shown in FIG. 24.

The carrier 600 includes a position adjustment device in the form of a bar 634 pivotally connected via pivots 635 (on bar 612) and 637 (on bar 612b) to the head part 602, body part 604, and foot part 606 as shown in FIGS. 21 and 23. A strut 613a extends downwardly from bar 612, the strut 613a including pivot pin 614a (as shown in FIG. 21A) which extends through slot 633 in bar 634. Thus, it will be seen that strut 613a and pivot pin 614a provide intermediate pivoting means for the bar 634.

It will now be apparent that pivoting of the head part 602 counter-clockwise causes the head part 602 to go up and at the same time causes the bar 634 to drag the foot part 606 downward, while pivoting the head part 602 in a clockwise direction causes the head part 602 to go down and at the same time causes the bar 634 to pull the foot part 606 upwardly.

The body part 604 will include a semi-circular track 650 having several openings 651 each adapted to receive a knub or pin 652 extending from bar 654 attached to head part 602 as shown. The semi-circular tracks 650 and pins and knubs 652 allow for positioning the head part 602 at any desired angle to the body part 604.

Again, the semi-circular tracks 650 may be replaced by a series of openings in side panels for the seat portion.

The frame formed by bar supports 609a, 609b, 609c, 610a, 610b, 610c, 614, 616 may be used to support a soft carrier 618 such as fabric, canvas, or soft plastic or even a hard carrier. If desired, the carrier may itself be constructed of rigid materials such as hard plastic, wood or metal such as aluminum.

Alternatively, the head-back portion, seat portion, and/or leg-foot portion of the carrier may be formed of rigid material such as hard plastic, wood or metal in which case the various portions may be self-supporting. In such case, the bar supports 609a, 609b, 609c, 610a, 610b, 610c, 614 and 616 will be a part of the head-back portion, seat portion, and/or leg-foot portion or when present serve as optional support structure for the various portions. Furthermore, the head-back portion and/or leg-foot portion may include longitudinally disposed hinges as shown in FIGS. 13 to 16.

As seen in FIG. 24, the carrier-frame combination may be folded flat for easy storage.

FIG. 21B shows an embodiment of a carrier 600a similar to that shown in FIG. 21 with the exception that the bar 634a is pivotally connected to bar 609a of the head portion and bar 609c of the foot portion. Thus pivot 614a and strut 613a are not needed although they may be present to pivotally secure a portion of bar 634a to the bar 609b of body portion 604. The bars 634 and/or 634a of FIGS. 21 and 21B may be formed of two telescoping sections or may be otherwise extensible so that the head and foot portions may be positioned and fixed at any desired angle to the body portion.

The carrier 600a of FIG. 21B will function in a manner similar to carrier 600 of FIG. 21.

Figure 25:
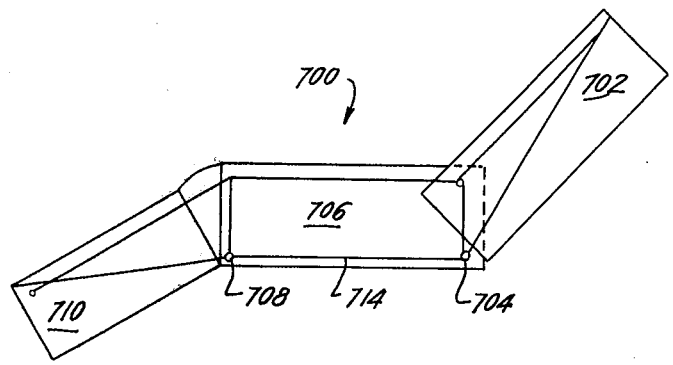
FIG. 25 is a schematic side view of another embodiment of a three-way carrier in accordance with the present invention.
Figure 26:
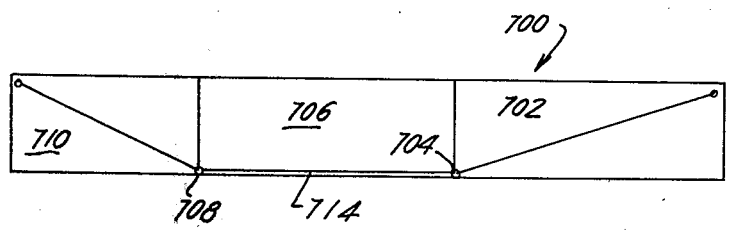
FIG. 26 is a side view of the three-way carrier of FIG. 25 in its collapsed position.

Referring now to FIGS. 25 and 26, another embodiment of a three-way carrier is illustrated indicated generally by the numeral 700 which includes head-back part 702 pivotally connected via pivot-lock 704 to body or seat part 706 which is pivotally connected via pivot-lock 708 to leg-foot part 710. As seen in FIG. 26, the carrier 700 is equipped with special means in the form of a cable 711 for controlling the movement of head part 702 and foot part 710 as now described. The cable 711 includes three sections, 712, 714 and 716. Cable 712 is employed in conjunction with and retained in head part 702, one end of cable 712 being connected to pivot-lock 704 which preferably takes the form of a conventional spring retention lock. Cable 714 is employed with body part 706 and connects up the spring-retention lock 704 with the pivot-lock 708 which also is preferably in the form of a spring-retention lock. Finally, cable 716 is employed with foot part 716 and is connected to spring-retention lock 708. The cables or cable sections 712, 714, 716 may be in the form of rods which brace and support the head part 702, body part 706, and foot part 710, respectively.

One of the unique features of the three-way carrier 700 is that through the interaction of the cables or rods 712, 714, 716 on the head part, body part and foot part and on the spring-retention locks 704 and 708, movement of the head part can cause corresponding movement of the foot part. Thus, for example, where the head part 702 is moved counter-clockwise as shown in FIG. 25, the cable section 712 acts on the spring-retention lock 704 to open same. Continued upward movement of the head part 702 causes the cables 712 and 714 to tighten which in turn causes spring-retention lock 708 to be opened. As the cables 712 and 714 are tightened with continued upward movement of head part 702, the cable 716 is tightened and with the aid of the spring-retention lock 708 carries and forces foot part 710 downwardly. Thus, in effect, the head part 702 and foot part 710 may be adjusted as a unit so that raising of the head part automatically causes lowering of the foot part, while lowering of the foot part causes raising of the head part. Of course, the reverse action is true so that lowering of the head part will cause a lessening of tension on cable 716 which allows it with the aid of the action of the spring-retention lock 708 to move upwardly back to the position shown in FIG. 26. Furthermore, depending upon the amount of upward movement or downward movement of head part 702, the foot part will be controlled to give a corresponding movement in the opposite direction.

What is claimed is:

1. A collapsible three-way carrier for infants comprising, in combination, a head-back portion, a seat portion pivotally connected to said head-back portion, and a leg-foot portion pivotally connected to said seat portion, and control means connected to said head-back portion and leg-foot portion, whereby when said head-back portion is pivoted in one direction with respect to said seat portion, said control means imparts corresponding movement of said leg-foot portion in a direction opposite to the movement of said head-back portion, said control means comprising a first member and a second member pivotally connected to each other, said first member also being fixedly connected to said head-back portion and said second member also being fixedly connected to said leg-foot portion, and a longitudinal hinge disposed in at least two of said head-back portion, seat portion and leg-foot portion and running along a substantial length of each of said portions dividing said portions into two sections, one of each of said sections including a lip which overhangs said longitudinal hinge whereby said lip permits pivoting of said sections about said longitudinal hinge in one direction but limits pivotal movement of said sections about said longitudinal hinge in the other direction below the horizontal whereby said portion may be folded about said longitudinal hinges to collapse said portion for storage.

2. The carrier as defined in claim 1 further including front and back legs pivotally mounted to said seat portion whereby when said legs are in their working position said carrier may be employed as a youth chair, high chair or car seat.

3. The carrier as defined in claim 1 wherein each of said longitudinal hinges run the length of its respective head-back portion, seat portion and leg-foot portion.

4. The carrier as defined in claim 1 wherein each of said longitudinal hinges are longitudinally spaced from each other.

5. The carrier as defined in claim 1 wherein said longitudinal hinges of said head-back portion and leg-foot portion stop short of said seat portion.

6. The carrier as defined in claim 5 wherein said longitudinal hinge of said seat portion stops short of said head-back portion and said leg-foot portion.

7. The carrier as defined in claim 1 wherein at least one of said head-back portion and leg-foot portion includes an end-support brace arrangement comprising, in combination, at least a pair of horizontal members pivotally attached to each other and to either side of said at least one of said headback portion and leg-foot portion, one of said horizontal members including a lip portion overhanging a portion of said other horizontal member at a position pivotally attached thereto, whereby said overhanging lip portion prevents the said other horizontal member from moving upwardly and accidentally collapsing the carriers.

8. The carrier as defined in claim 1 wherein said carrier includes a longitudinal hinge disposed in at least one of said head-back portion or leg-foot portion, and further including an end-support brace arrangement comprising a pair of upper horizontal members pivotally attached to each other, and further including a pair of normally vertically disposed end members, upper ends of each being pivotally connected to said upper horizontal members, and lower ends of each being pivotally connected to said at least head-back portion or leg-foot portion or support bracing for said portions, and an intermediate vertical member pivotally connected to each of said upper horizontal members and in effect pivotally connecting said upper horizontal members to each other, said intermediate vertical member including an upper lip which overhangs the juncture of said upper horizontal members to prevent accidental upward movement of said horizontal members.

9. The carrier as defined in claim 8 further including lower horizontal members pivotally connected to each of said vertically disposed end members and to said intermediate vertical member, and further including a lower lip extending from said intermediate vertical member, said lower lip being connected to said longitudinal hinge.

10. The carrier as defined in claim 1 wherein said head-back portion and leg-foot portion each includes an end support brace arrangement, each arrangement comprising first and second normally vertically disposed end members, lower portions of which are pivotally connected to said head-back portion or leg-foot portion, respectively, first and second upper horizontal members, pivotally connected to an upper portion of said vertically disposed end members, an intermediate vertical member disposed intermediate said vertically disposed end members, a lower portion of said intermediate vertical member being pivotally connected to a portion of said carrier, and in communication with said longitudinal hinge, each of said upper horizontal members being pivotally connected to said intermediate vertical member at a common pivot point, said first upper horizontal members or said intermediate vertical member including an upper lip portion extending above said common pivot point and the portion of said second upper horizontal member connected to said common pivot point, said intermediate vertical member also including a lower lip portion overhanging and connected to said longitudinal hinge whereby to collapse said carrier said upper lip portion is moved upwardly away from said carrier thereby causing said intermediate vertical member-lower lip portion to raise said longitudinal hinge, said lip portions also preventing accidental collapse of said carrier when in use.

11. The carrier as defined in claim 1 further including tilt means for positioning and temporarily fixing the head-back portion at a desired angle to the seat portion.

12. The carrier as defined in claim 11 wherein said tilt means comprises adjustable positioning means connected between and to said head-back portion or seat portion, said adjustable positioning means containing at least two positions thereon, and engaging means in communication with a portion of said seat portion or head-back portion, for engaging at least one of said positions of said adjustable positioning means thereby temporarily fixing the position of said head-back portion with respect to said seat portion.

13. The carrier as defined in claim 12 wherein said adjustable positioning means includes at least two openings for said at least two positions and said engaging means comprises spring-loaded plunger means adapted to engage at least one opening of said adjustable positioning means, said spring-loaded plunger means being affixed to said head-back portion or said seat portion.

14. The carrier as defined in claim 13 further including plunger control means for withdrawing said plunger from said opening of said adjustable positioning means to move said head-back portion with respect to said seat portion, and for inserting said plunger into said opening of said adjustable positioning means for temporarily fixing the position of said head-back portion with respect to said seat portion.

15. The carrier as defined in claim 14 wherein said spring-loaded plunger means includes a casing affixed to a portion of said seat portion or head-back portion and a plunger member including a plunger pin and plunger head, and said plunger control means comprises a wedge member including a slot disposed therein, said wedge member being disposed between said plunger casing and said plunger head with said plunger pin extending through said slot and one side of said wedge member into alignment with at least one opening of said adjustable positioning means, and said plunger head extending from the other side of said slot and wedge member, whereby moving of said wedge member in one direction causes said plunger head to be forced away from said adjustable positioning means thereby causing the plunger pin to be withdrawn from the opening of said adjustable positioning means, and moving the wedge member in the opposite direction allows the plunger pin to move into an opening of said adjustable positioning means.

16. A collapsible three-way carrier for infants, comprising, in combination, a head-back portion and seat portion pivotally connected to said head-back portion, and optionally including a leg-foot portion pivotally connected to said seat portion, and an end-support brace arrangement associated with at least one of said head-back portion and leg-foot portion, said end-support brace arrangement comprising at least a pair of horizontal members pivotally attached to each other and to either side of said at least one of said head-back portion and leg-foot portion, one of said horizontal members including an overhanging lip portion which overhangs a portion of said other horizontal member pivotally attached thereto, whereby said overhanging lip portion prevents the said other horizontal member from moving upwardly and accidentally collapsing the carrier and further including a pair of normally vertically disposed end members, upper ends of each being pivotally connected to said horizontal members, and lower ends of each being pivotally connected to said at least head-back portion and leg-foot portion or support bracing for said portions, and an intermediate vertical member pivotally connected to each of said horizontal members and in effect pivotally connecting said horizontal members to each other.

17. A collapsible three-way carrier for infants, comprising, in combination, a head-back portion and seat portion pivotally connected to said head-back portion, and optionally including a leg-foot portion pivotally connected to said seat portion, and tilt means for positioning and temporarily fixing the head-back portion at a desired angle to the seat portion comprising adjustable positioning means connected between and to said head-back portion or seat portion, said adjustable positioning means including at least two openings, and engaging means in communication with a portion of said seat portion or head-back portion, for engaging at least one of said openings of said adjustable positioning means, said adjustable positioning comprising spring-loaded plunger means affixed to a portion of said seat portion or head-back portion and including a casing, a spring-loaded plunger pin retained in said casing and plunger head, and plunger control means comprising a wedge member including a slot disposed therein, said wedge member being disposed between said plunger casing and said plunger head with said plunger pin extending through said slot and one side of said wedge member into alignment with at least one opening of said adjustable positioning means, and said plunger head extending from the other side of said slot and wedge member, whereby moving of said wedge member in one direction causes said plunger head to be forced away from said adjustable positioning means thereby causing the plunger pin to be withdrawn from the opening of said adjustable positioning means, and moving the wedge member in the opposite direction allows the plunger pin to move into an opening of said adjustable positioning means.

18. The carrier as defined in claim 17 further including return spring means connected to said wedge member and carrier.

19. The carrier as defined in claim 18 further including remote means for moving said wedge member.

20. The carrier as defined in claim 19 wherein said remote means comprises cable or spring means, one portion of which is connected to one or two of said wedge members and the other portion of which is disposed at an upper portion of said carrier so that one or two of said wedge members may be controlled from the same cable using one hand.

21. The carrier as defined in claim 17 wherein said wedge member includes gripping means to facilitate moving thereof.

22. The carrier as defined in claim 17 wherein said carrier further includes arm rest means including an opening therein in alignment with an opening of said adjustable positioning means and said plunger casing is connected to said arm rest means in a manner so that said plunger pin is adapted to pass through the opening of said arm rest means and an opening in said adjustable positioning means to fix the position of said head-back portion with respect to said seat portion.

23. A collapsible three-way carrier for infants comprising, in combination, a head-back portion, a seat portion pivotally connected to said head-back portion, and a leg-foot portion pivotally connected to said seat portion, and control means connected to said head-back portion and leg-foot portion, whereby when said head-back portion is pivoted in one direction with respect to said seat portion, said control means imparts corresponding movement of said leg-foot portion in a direction opposite to the movement of said head-back portion, and a longitudinal hinge disposed in at least one of said head-back portion, seat portion and leg-foot portion and dividing said portion into two sections, whereby said portion may be folded about said longitudinal hinge to collapse said portion for storage, said carrier further including tilt means for positioning and temporarily fixing the head-back portion at a desired angle to the seat portion, said tilt means comprising adjustable positioning means connected between and to said head-back portion or seat portion, said adjustable positioning means containing at least two positions thereon in the form of openings, and engaging means in communication with a portion of said seat portion or head-back portion, for engaging at least one of said positions of said adjustable positioning means thereby temporarily fixing the position of said head-back portion with respect to said seat portion, said engaging means comprising spring-loaded plunger means being adapted to engage at least one opening of said adjustable positioning means, said spring-loaded plunger means affixed to said head-back portion or said seat portion, and further including plunger control means for withdrawing said plunger from said opening of said adjustable positioning means to move said head-back portion with respect to said seat portion, and for inserting said plunger into said opening of said adjustable positioning means for temporarily fixing the position of said head-back portion with respect to said seat portion, said spring-loaded plunger means including a casing affixed to a portion of said seat portion or head-back portion and a plunger member including a plunger pin and plunger head, and said plunger control means comprising a wedge member including a slot disposed therein, said wedge member being disposed between said plunger casing and said plunger head with said plunger pin extending through said slot and one side of said wedge member into alignment with at least one opening of said adjustable positioning means, and said plunger head extending from the other side of said slot and wedge member, whereby moving of said wedge member in one direction causes said plunger head to be forced away from said adjustable positioning means thereby causing the plunger pin to be withdrawn from the opening of said adjustable positioning means, and moving the wedge member in the opposite direction allows the plunger pin to move into an opening of said adjustable positioning means.

24. A collapsible three-way carrier for infants comprising, in combination, a head-back portion, a seat portion pivotally connected to said head-back portion, and a leg-foot portion pivotally connected to said seat portion, and control means connected to said head-back portion and leg-foot portion, whereby when said head-back portion is pivoted in one direction with respect to said seat portion, said control means imparts corresponding movement of said leg-foot portion in a direction opposite to the movement of said head-back portion, and a longitudinal hinge disposed in at least one of said head-back portion, seat portion and leg-foot portion and dividing said portion into two sections, whereby said portion may be folded about said longitudinal hinge to collapse said portion for storage, said back rest portion further including back side and end bar supports disposed about the sides and ends of said head-back portion, said back side and end bar supports being pivotally connected to each other, and said seat portion including seat side and end bar supports disposed about the sides and ends of said seat portion, said seat side and end bar supports being pivotally connected to each other, said control means being connected to a back side bar support or to the juncture between said back side and end bar supports, and to an underside foot bar support, and further including strut means pivotally connecting said control means to a seat side bar support, for supporting and providing a pivot point for said control means.

25. A collapsible three-way carrier for infants comprising, in combination, a head-back portion, a seat portion pivotally connected to said head-back portion, and a leg-foot portion pivotally connected to said seat portion, and control means connected to said head-back portion and leg-foot portion, whereby when said head-back portion is pivoted in one direction with respect to said seat portion said control means imparts corresponding movement of said leg-foot portion in a direction opposite to the movement of said head-back portion, and a longitudinal hinge disposed in at least one of said head-back portion, seat portion and leg-foot portion and dividing said portion into two sections, whereby said portion may be folded about said longitudinal hinge to collapse said portion for storage, said back rest portion further including back side and end bar supports disposed about the sides and ends of said head-back portion, said back side and end bar supports being pivotally connected to each other, and said seat portion including seat side and end bar supports disposed about the sides and ends of said seat portion, said seat side and end bar supports being pivotally connected to each other, said leg-foot portion including foot side and end bar supports, corner bar supports, and optionally at least one bar support connected to a lower corner thereof and running at least partially down the underside surface of said leg-foot portion, the lower or front end foot bar support including an intermediate disposed pivot-lock whereby said foot end bar support may be broken into two sections which may be pivoted inwardly or outwardly and the upper end head-back bar support including an intermediate disposed pivot-lock whereby said upper end back rest bar support may be broken into two sections which may be pivoted inwardly or outwardly.

26. A collapsible three-way carrier for infants comprising, in combination, a head-back portion, a seat portion pivotally and hingedly connected to said head-back portion, and a leg-foot portion pivotally and hingedly connected to said seat portion, and control means connected to said head-back portion and leg-foot portion, whereby when said head-back portion is pivoted in one direction with respect to said seat portion, said control means imparts corresponding movement of said leg-foot portion in a direction opposite to the movement of said head-back portion, and a longitudinal hinge disposed in at least one of said head-back portion, seat portion and leg-foot portion and dividing said portion into two sections, whereby said portion may be folded about said longitudinal hinge to collapse said portion for storage, further including pivot-lock means connected to the hinge disposed betwen said head-back portion and seat portion, and pivot-lock means connected at the hinge between said seat portion and leg-foot portion, and further including cable rod means for controlling the movement of the head-back portion and leg-foot portion, said cable rod means including a first cable section employed in conjunction with and retained in the head-back portion, and connected to said hinge pivot-lock, a second cable section retained in the seat portion and connected to said hinges between said head-back portion-seat portion and between said seat portion-leg foot portion, and a third cable section connected to the hinge between said seat portion-leg-foot portion and retained in said leg-foot portion, whereby upward movement of said head-back portion causes the cable rod means to act on said pivot-locks to open same and force the leg-foot portion downwardly.

27. The carrier as defined in claim 23 further including return spring means connected to said wedge member and carrier.

28. The carrier as defined in claim 27 further including remote means for moving said wedge member.

29. The carrier as defined in claim 28 wherein said remote means comprises cable or spring means, one portion of which is connected to said wedge member and the other portion of which is disposed at an upper portion of said carrier.

30. The carrier as defined in claim 28 wherein said wedge member includes gripping means to facilitate moving thereof.

31. The carrier as defined in claim 28 wherein said carrier further includes arm rest means including an opening therein in alignment with an opening of said adjustable positioning means and said plunger casing is connected to said arm rest means in a manner so that said plunger pin is adapted to pass through the opening of said arm rest means and an opening in said adjustable positioning means to fix the position of said head-back portion with respect to said seat portion.

32. The carrier as defined in claim 23 wherein said control means connecting up said head-back portion and seat portion includes an opening therein in alignment with an opening of said adjustable positioning means, and said plunger casing is connected to said control means in a manner such that said plunger pin is adapted to pass through the opening of said control means and an opening in said adjustable positioning means.

33. The carrier as defined in claim 25 further including cable control means connected to each of the pivot-locks of said foot portion and back rest portion for opening said pivot-locks to facilitate collapsing of said lower or front end foot bar support and said upper end back rest bar support.

34. The carrier as defined in claim 33 further including handle control means for manipulating the position of said cable control means.

35. The carrier as defined in claim 34 wherein said cable control means is disposed along said upper end bar support of said head-back portion, along said side bar supports of said head-back portion, seat and leg portions, and along said lower or front end bar support of said leg portion.

36. The carrier as defined in claim 33 wherein said pivot-locks are of the spring-retention type.

37. The carrier as defined in claim 25 further including at least one frame lock disposed on one of said seat side bar supports for locking said carrier to a separate support frame.

38. The carrier as defined in claim 37 wherein one of said frame locks is disposed on each of said seat side bar supports and connected to said cable control means.

39. The carrier as defined in claim 26 further including lower horizontal members pivotally connected to each of said vertically disposed end members and to said intermediate vertical member and to said longitudinal hinge.

40. The carrier as defined in claim 26 wherein said carrier includes a longitudinal hinge, and said head-back portion and leg-foot portion each includes an end support brace arrangement, each arrangement comprising first and second normally vertically disposed end members, lower portions of which are pivotally connected to said head-back portion or leg-foot portion, respectively, first and second upper horizontal members, pivotally connected to an upper portion of said vertically disposed end members, an intermediate vertical member disposed intermediate said vertically disposed end members, a lower portion of said intermediate vertical member being pivotally connected to a portion of said carrier and in communication with said longitudinal hinge, each of said upper horizontal members being pivotally connected to said intermediate vertical member at a common pivot point, said first upper horizontal members including a lip portion extending above said common pivot point and the portion of said second upper horizontal member connected to said common pivot point, whereby to collapse said carrier said lip portion is moved upwardly away from said carrier thereby causing said intermediate vertical member to raise said longitudinal hinge, said lip portion also preventing accidental collapse of said carrier when in use.

* * * * *